United States Patent

Knapp

[11] Patent Number: 5,816,289
[45] Date of Patent: Oct. 6, 1998

[54] DEVICE FOR DAMPENING VIBRATION AND NOISE IN HYDRAULIC INSTALLATIONS

[75] Inventor: Alfons Knapp, Biberach/Riss, Germany

[73] Assignee: Masco Corporation, Taylor, Mich.

[21] Appl. No.: 762,505

[22] Filed: Dec. 10, 1996

Related U.S. Application Data

[62] Division of Ser. No. 602,141, Feb. 15, 1996, Pat. No. 5,613,520, which is a division of Ser. No. 259,807, Jun. 15, 1994, Pat. No. 5,494,076.

[30] Foreign Application Priority Data

Jun. 22, 1993 [IT] Italy .................................. TO93A0449

[51] Int. Cl.⁶ .......................... F16K 11/074; F16K 47/02; F16K 55/05
[52] U.S. Cl. .................... 137/625.17; 137/625.4; 138/30
[58] Field of Search ........................... 137/625.17, 625.4; 138/30

[56] References Cited

U.S. PATENT DOCUMENTS

| | | | |
|---|---|---|---|
| 2,051,019 | 8/1936 | Arutunoff | 138/30 |
| 3,061,039 | 10/1962 | Peters | 138/30 X |
| 3,621,882 | 11/1971 | Kupiec | 138/30 |
| 4,759,387 | 7/1988 | Arendt | 138/30 |
| 4,768,616 | 9/1988 | Richard et al. | 138/30 X |
| 4,821,777 | 4/1989 | Martin | 138/30 |

FOREIGN PATENT DOCUMENTS

| | | | |
|---|---|---|---|
| 331907 | 10/1903 | France | 138/30 |
| 2486397 | 2/1983 | France | |
| 2421372 | 11/1975 | Germany | |
| 3000990 | 7/1981 | Germany | |
| 607402 | 8/1960 | Italy | 138/30 |

*Primary Examiner*—John Rivell
*Attorney, Agent, or Firm*—Myron B. Kapustij; Malcolm L. Sutherland

[57] ABSTRACT

A noise and vibration dampening device for mixing valves for faucets and the like. The device comprises an envelope comprised of flexible material defining an air pocket. The envelope is disposed in an area where it is in contact with water but is out of the direct stream of the water flow. The water in contact with the envelope is also in contact with the stream of water flowing into the mixing valve.

5 Claims, 4 Drawing Sheets

DEVICE FOR DAMPENING VIBRATION AND NOISE IN HYDRAULIC INSTALLATIONS

This application is a divisional of application Ser. No. 08/602,141 filed on Feb. 15, 1996, now U.S. Pat. No. 5,613,520; which is a division of application Ser. No. 08/259,807 filed on Jun. 15, 1994, now U.S. Pat. No. 5,494,076.

BACKGROUND OF THE INVENTION

This invention is directed to a device for dampening the vibration and noise produced in a hydraulic installation.

Hydraulic appliances, particularly mixer valves for hot and cold water, under certain conditions of operation produce a vibration which is mainly due to cavitation phenomena and to the sharp deflections imposed on the flow path of water in the valve. This vibration is transmitted by the water to the supply tubes and to the main pipes. The vibration causes noise. This vibration is detrimental and the noise it produces is annoying. Furthermore, the amount of noise that can be produced is often regulated by law.

If no special means are provided to reduce the vibration the transmission of this vibration takes place without any noticeable damping due to the incompressibility of the water. The means usually adopted for limiting or reducing noise consist in compensating for the incompressibility of water by including, along the flow path of the water, elastically yielding regions formed by air pockets enclosed in envelopes of a flexible, usually elastomeric, material. For example, Italian Patent No. 1,141,569 discloses air pockets defined by annular envelopes having a C-shaped cross section inserted in the passages between the intakes of the tap body and the fixed plate controlling the water volume through which the water flows. According to German Patent No. 3,000,990 air pockets are defined by finned tubular envelopes inserted in the passages through which water flows between the intakes of the tap body and a fixed plate controlling the water volume. Furthermore, according to the German Patent No. 2,421,372 air pockets are defined by tubular envelopes located within passages provided for the water inlet in the body of a tap. Other arrangements are also known and they may be disposed either in a tap body or in the S-shaped connections usually employed for connecting a tap to water intakes. It is a feature common to all these arrangements that the envelopes enclosing the air pockets are located in the flow path of water so that the envelopes are in direct contact with the water flow. It was thought, until now, that direct contact between such envelopes and the water flow was essential to dampen vibration.

In these known and conventional devices the dampening action is due to the elastic resilience of the air enclosed in the pockets, which air is separated from the water by the envelopes of elastomeric material defining the air pockets. The presence of the envelopes reduces or limits the damping action of the air pockets; however, the envelopes are essential in order to keep the air in the pockets. Therefore, in order to improve the dampening action by reducing the hindrance of the envelopes, it is necessary for the envelopes to have a great deformability, namely, they should be thin. However, if an envelope is very thin the water flow contacting the thin envelope produces dynamic actions inducing a vibration in the envelope. This vibration is harmful and results in deterioration of the envelope. For this reason it is not possible to reduce the thickness and, therefore, the stiffness of the envelopes below certain limits. This inability to sufficiently reduce the thickness and stiffness of the envelopes greatly limits the effectiveness of known dampening means. Moreover, in certain cases the insertion of a tubular envelope in the flow path of the water is very difficult due to the limited space available. This is the case, for example, in those taps which are supplied through stiff tubes or hoses. To insert a dampening envelope in such taps would necessitate a noticeable and costly increase in the length of the tap body.

An object of this invention is to optimize the use of air pockets defined by envelopes of flexible material in order to dampen the vibration and noise in a hydraulic installation. Another object of the invention is to obtain a dampening action more effective than that which can be attained with conventional and known damping means. Another object is to allow the installation of an envelope defining an air pocket in locations with limited available space. Still another object of the invention is to provide arrangements of envelopes defining the air pockets in which the envelopes do not vibrate and do not deteriorate due to the water flow.

SUMMARY OF THE INVENTION

The invention is based on the unexpected observation that the dampening action exerted by an air pocket enclosed in an envelope of flexible material requires that the water in contact with the envelope is in communication with the water forming the water flow to be dampened, but it does not require the envelope to be directly in contact with this flow, i.e., be in the flow path of the water Therefore, the subject of this invention is a device intended to dampen the vibration and noise produced in a hydraulic installation such as a faucet mixing valve. The device includes an envelope of a flexible material which defines an air pocket and contacts the water of the hydraulic installation, characterized in that said envelope is located in a space which communicates with the spaces through which the flow path of the water runs, but through which space no appreciable part of the flow runs. The envelope is not directly in the flow path of the water and therefore undergoes no dynamic action therefrom.

In such conditions the vibration produced within the installation is transmitted to the water mass which occupies the space wherein the dampening device is located and is in contact with the damping device. The dampening action exerted by the air pocket on the water mass which is in direct contact with the envelope defining the air pocket extends and is transferred, due to the substantial incompressibility of the water, to the water mass which does not directly contact the envelope, i.e., to the water flow. Because the envelope is not in contact with the flowing water, the flowing water does not exert any dynamic action on the envelope. The envelope may, therefore, be quite thin, a great deal thinner than an envelope directly in contact with flowing water. Thus, particularly effective dampening is obtained, even with very small air pockets. Furthermore, vibration generated in the envelope itself is avoided and deterioration of the envelope by action of the flowing water is avoided. Because the space containing the envelope defining the air pocket is in communication with the spaces through which the water flows but is not a part thereof, this space may be located in any position with respect to the passages through which the water flows. This allows the installation of the device even in those cases in which the limited available space does not allow installation of any of the known conventional dampening devices.

DETAILED DESCRIPTION OF THE PREFERRED EMBODIMENTS

Figure 1:
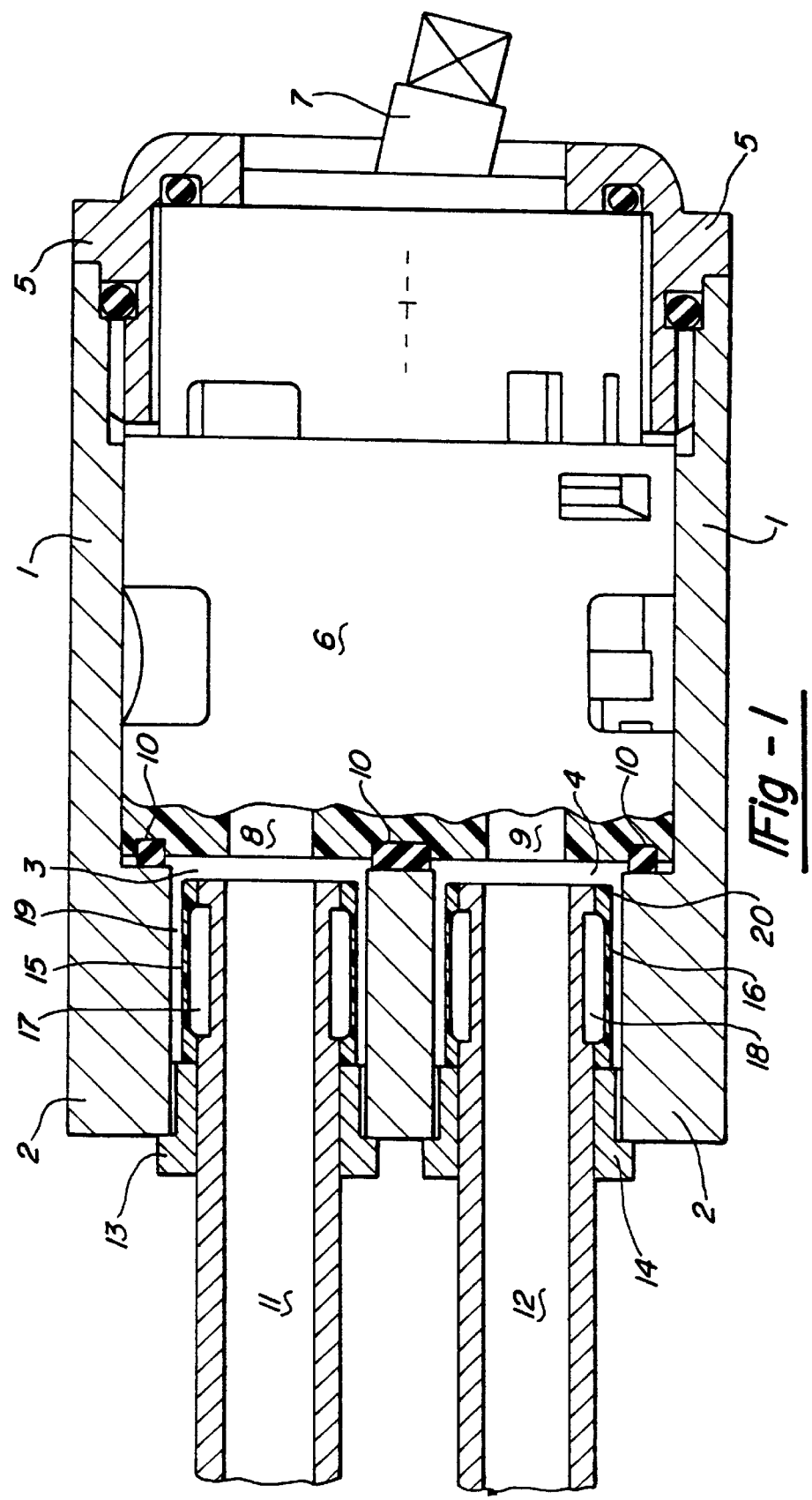
FIG. 1 illustrates a partial cross sectional view of the body of a faucet and a cartridge having stiff water supply pipes incorporating the dampening device of the invention, with most of the cartridge shown in external view and only the bottom part thereof shown in cross section.

With reference to FIG. 1, there is shown the cross section of a faucet body 1, having a bottom 2 with water inlet apertures 3 and 4 for inlet of hot and cold water, and closed at its top by a cover 5. Cover 5 maintains cartridge 6 in position inside the body 1. Cartridge 6 is provided with a control lever 7. Cartridge 6 is of a type which is conventional and well known in the art and contains well known and conventional valve means which are controlled by lever 7 actuated by the user and regulate the mixing ratio between hot and cold water as well as the volume of water. Cartridge 6 is shown in FIG. 1 in external view and only its hot and cold water intakes 8 and 9 are shown in section. The cartridge also has a delivery passage (not shown). Cartridge 6 is mounted within body 1 of the faucet and suitable seals 10 are provided for ensuring sealing with respect to bottom 2.

The faucet shown in FIG. 1 is supplied by stiff water supply pipes 11 and 12 ending at the bottom 2. In the embodiment shown in FIG. 1 two dampening devices of the present invention are associated with the supply pipes 11 and 12. Pipes 11 and 12 are sized to extend up to near the top end of inlet apertures 3 and 4 of bottom 2, and are provided with threaded rings 13 and 14, respectively, for connection to the bottom 2. On the outside walls of the ends of tubes 11 and 12, which ends extend past rings 13 and 14 into the apertures 3 and 4, are disposed envelopes 15 and 16. Envelopes 15 and 16 are comprised of flexible and preferably elastomeric material. The walls of envelopes 15 and 16 together with the outer walls of tubes 11 and 12 define air pockets 17 and 18, respectively. Envelopes 15, 16 have an outer diameter which is smaller than the diameter of the apertures 3 and 4, and therefore the outer surfaces of the envelopes together with the walls defining apertures 3 and 4 define spaces 19 and 20 which surround the envelopes 15, 16.

In FIG. 1 water flows through the supply pipes 11, 12 into apertures 3 and 4. Since the pipes 11 and 12 are disposed in apertures 3 and 4 with their ends quite close to apertures 3, 4 opening into the cavity in the faucet body, water exiting the ends of pipes 3 and 4 flows or travels only along a brief distance of the end portion of the inlet apertures 3 and 4, and the water flow is directed, more or less directly, toward the cartridge inlets 8 and 9. Inlets 8 and 9 are directly aligned with the supply tubes 11 and 12. However, the above described situation does not change even if the cartridge inlets 8 and 9 are displaced with resect to the supply pipes 11 and 12. The water flow does not run through spaces 19 and 20, which are displaced from and out of the way of the direct flow path of the water. Therefore, the stream of water flowing into the interior of the faucet body does not directly contact the envelopes 15 and 16. Consequently, envelopes 15, 16 may be very thin because they have no direct contact with the water stream. The water stream entering the apertures 3, 4 from the supply pipes 11, 12 bypasses envelopes 15, 16 since they are out of the path of the flow of this water stream. The envelopes are not exposed to the direct force of the water stream. The spaces 19 and 20 surrounding envelopes 15, 16 contain water, generally backflow or spill water coming from the water stream exiting the pipes 11, 12. The vibration produced within the faucet/pipe assembly, which gives rise to period variations in water pressure, is transmitted by the water contained in the pipes 11 and 12 through the top portions of the inlet apertures 3 and 4 to the spaces 19 and 20 wherein air pockets 17 and 18 within thin envelopes 15 and 16 exert their dampening effects. Therefore, periodic pressure variations are effectively dampened within the spaces 19 and 20, and this dampening action is transmitted through the water in spaces 19 and 20 to the main water mass of the flow to be dampened. In this way a very effective dampening is achieved while simultaneously protecting the thin envelopes 15 and 16.

Figure 2:
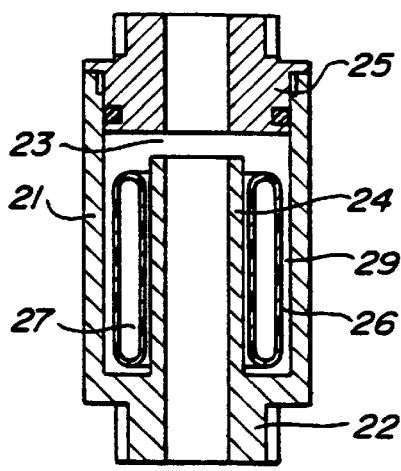
FIG. 2 illustrates the damping device incorporated in a connecting member such as a pipe.

In FIG. 2 a connecting member, which may be inserted between any appropriate parts in a hydraulic system, includes a hollow body 21 having a threaded bottom 22 for connection to a component part of the hydraulic plant, and a cover 25, also threaded, for connection to another component part of the hydraulic plant. The flow stream of the plant thus runs across the connection 21–25. Inside the connection is chamber 23 which is traversed up to near its end by a tube section 24. In the embodiment illustrated in FIG. 2 the tube section is integral with and forms the bottom 22. Around the exterior of tube section 24 there is disposed an envelope 26, which in this embodiment has a hollow toroidal shape, whose interior defines an air pocket 27. The space 29 which surrounds tube section 24 and envelope 26 communicates with the space inside the tube section 24, through which the water stream flows, but is offset with respect thereto so that the water stream does not pass through this space 29. Therefore envelope 26 is not in the direct path of the water stream. The dampening action occurs in space 29, which space is filled with water. It is understood that the structure of FIG. 2 functions in a manner identical to that described with reference to FIG. 1 to dampen the vibration and noise. The connection may be inserted between any parts of a hydraulic system. It is to be understood that the water flow may run across the connection in FIG. 2 from top to bottom or from bottom to top.

Figure 3:
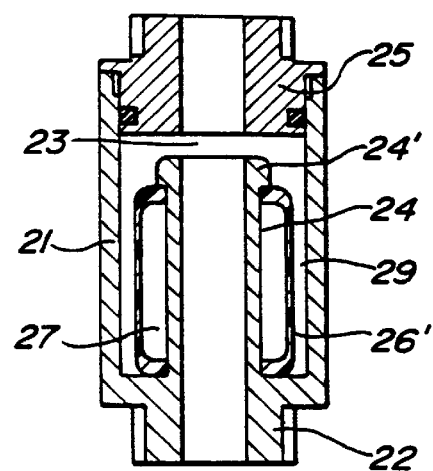
FIG. 3 illustrates a second embodiment of the dampening device disposed in a connecting member.

In the embodiment illustrated in FIG. 3 which shows a connection similar to that of FIG. 2, the envelope 26' has a toroidal shape with a C-shaped cross section and defines an air pocket 27 between its own surface and the outer wall of tube section 24. The tube section 24 has at its end an enlargement 24" intended to retain envelope 26'. The operation of this device is identical to that of the device disclosed in FIG. 2.

Figure 4:
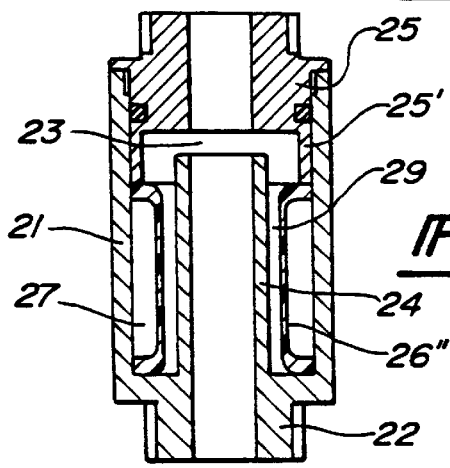
FIG. 4 illustrates a third embodiment of the dampening device.

In the embodiment illustrated in FIG. 4 the envelope 26" has a toroidal shape with a C-shaped cross section and defines the air pocket 27 between its own surface and the interior wall of the connection body 21. The cover 25 has a tubular portion 25" extending downward to keep the envelope 26" in position. The operation of this device is identical to that of the device disclosed in FIG. 2.

Figure 5:
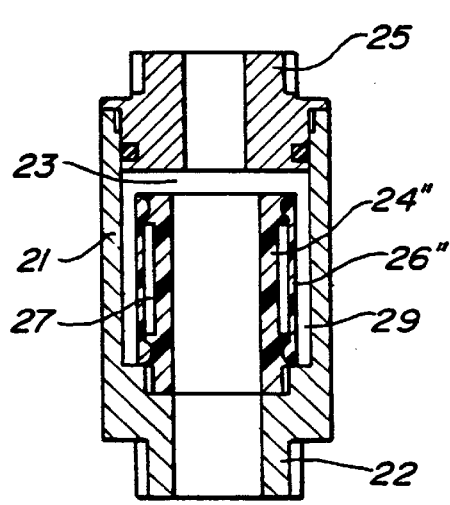
FIG. 5 illustrates a fourth embodiment of the dampening device.
Figure 6:
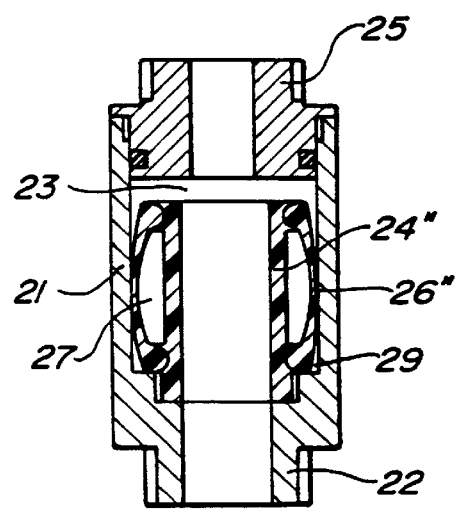
FIG. 6 illustrates a fifth embodiment of the dampening device.

The embodiments illustrated in FIGS. 5 and 6 are similar to the embodiment of FIG. 3 except that the tube section 24" is formed separately and is not an integral part of bottom 22. This facilitates machining tube section 24" and allows provision of hollow seats which engage the enlarged rims at the top and bottom of envelope 26".

Figure 7:
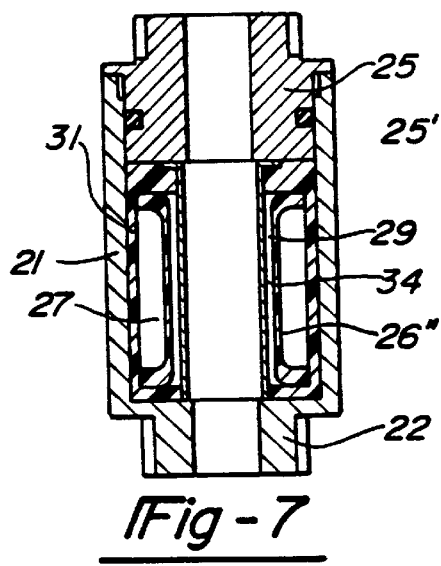
FIG. 7 illustrates a sixth embodiment of the dampening device.

FIG. 7 shows an embodiment similar to that of FIG. 4 except that the tube section 24 is replaced by a perforated tube 34, which extends from bottom 22 up to the cover 25 of the connection. The space 29 surrounding the thin envelope 26" communicates with the hydraulic assembly across which the water stream flows through the perforations of tube 34. Because this tube extends from the bottom 22 up to the cover 25, no noticeable flow runs across space 29. Therefore, the dampening operation is identical to that of FIG. 2. Of course, it is not necessary that tube 34 be completely perforated, it may also be partially perforated or have only one opening. In order to simplify manufacturing parts 26"–34 may be included in a cartridge 31, inserted within the cavity of the connection body 21.

Figure 8:
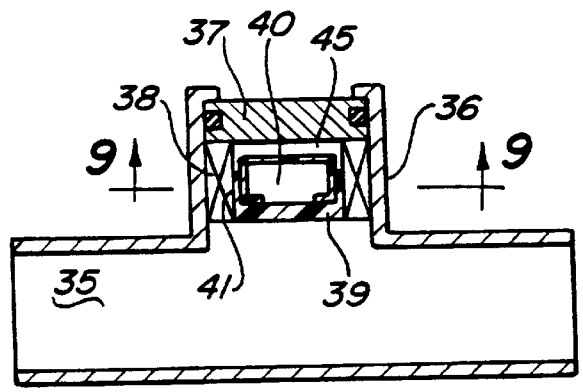
FIG. 8 illustrates a dampening device mounted in an extension of a tube section.
Figure 9:
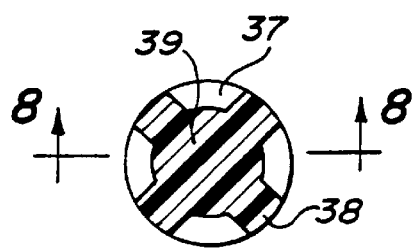
FIG. 9 is a cross section taken along line IX—IX of FIG. 8.
Figure 13:
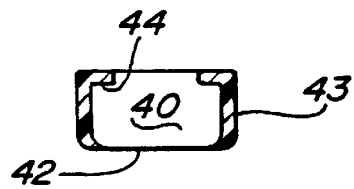
FIG. 13 illustrates in a cross section a capsule shaped envelope of the invention.

FIGS. 8 and 9 show how a dampening device of the instant invention may be installed in a branch of pipes of a hydraulic system. As illustrated in FIG. 8, pipe 35 has a branch 36 closed by a plug 37 which, by means of bridges 38, supports an inner bottom 39. On the bottom 39 there is mounted an envelope 41 which defines an air pocket 40. Space 45 between the envelope 41 and plug 37 communicates with the space in the interior of pipe 35 (through which water flows) through the free spaces between the bridges 38. Therefore, air pocket 40 exerts its dampening action on the water contained in space 45 by acting through the envelope 41 which is not in the direct path of the water flow. The operation of this embodiment is identical to that of FIG. 1. The envelope, designated by numeral 41, is shaped like a capsule as shown in section in FIG. 13, with a thin membrane-like portion 42 (which is the active portion for the purpose of dampening), a supporting peripheral wall 43 (which may have any suitable thickness) and an inwardly bent rim 44. Such envelope, installed in a corresponding hollow seat, seals by means of its peripheral wall 43, whereas the rim 44 ensures the maintenance of and also an increase in the sealing action when the thin membrane portion 42 is deformed by water pressure.

Figure 10:
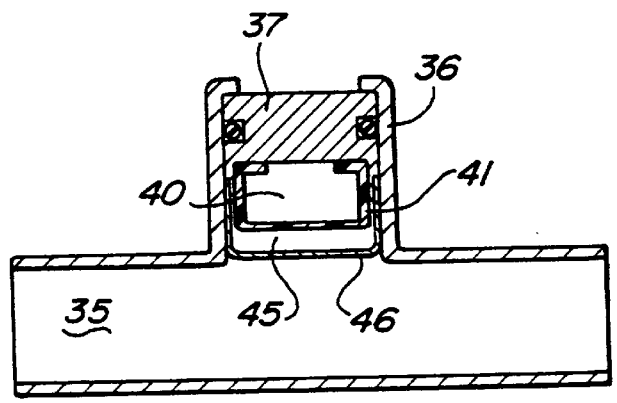
FIG. 10 illustrates a modification of the device of FIG. 8.

FIG. 10 illustrates a modification of the structure of FIG. 8. Flexible envelope 41 is mounted to the plug 37 and faces the interior space of pipe 35 through which the water flow runs. The space 45 is separated from the interior space of pipe 35 by a perforated separation member 46. Space 45, wherein air pocket 40 exerts the dampening action through the capsule envelope 41, communicates through perforations in member 46 with the interior of pipe 35 through which runs the water flow.

Figure 11:
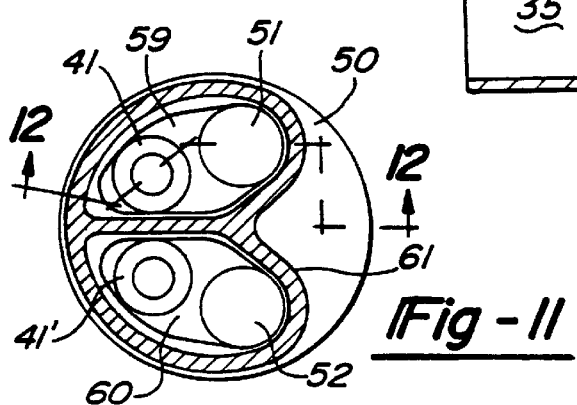
FIG. 11 illustrates a bottom view of an intermediate member incorporating two dampening devices of the invention inserted between the bottom of the faucet body and the cartridge.
Figure 12:
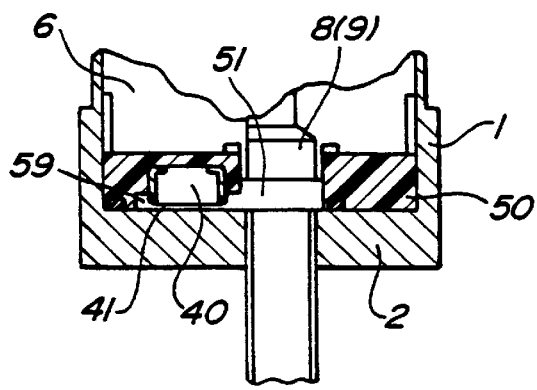
FIG. 12 is a cross section taken along line XII—XII of FIG. 11.

FIGS. 11 and 12 illustrate an intermediate member 50 adapted to be interposed between the bottom 2 of a faucet or tap body 1 and the bottom of a cartridge 6 in order to dampen vibration and noise. The intermediate member 50 has passages 51, 52 in register with the supply pipes 11, 12 terminating at the bottom 2 of the tap body 1 and with the inlet passages 8 and 9 of the cartridge. Passages 51, 52 also communicate with spaces 59 and 60 adjacent envelopes 41 and 41'. A suitably shaped packing 61 limits and separates spaces 51, 59 from 52, 60. Each envelope 41, 41' effects a dampening action within the corresponding space 59, 60 and, therefore, in pipes 11, 12 with which said space communicates. It is noted that the arrangement of spaces 59, 60 beside the passages 51 and 52 allows installation of the dampening devices without the need of any noticeable increase in the length of the tap or faucet body 1. This allows the installation of dampening devices in areas where it was not possible to instal prior art dampening devices.

It is further noted that the intermediate member 50 may be used for connecting supply pipes 11, 12 and cartridge inlets 8, 9 which are misaligned. With this arrangement it is possible to provide an intermediate member 50 to connect passages which are displaced or misaligned from each other.

Figure 14:
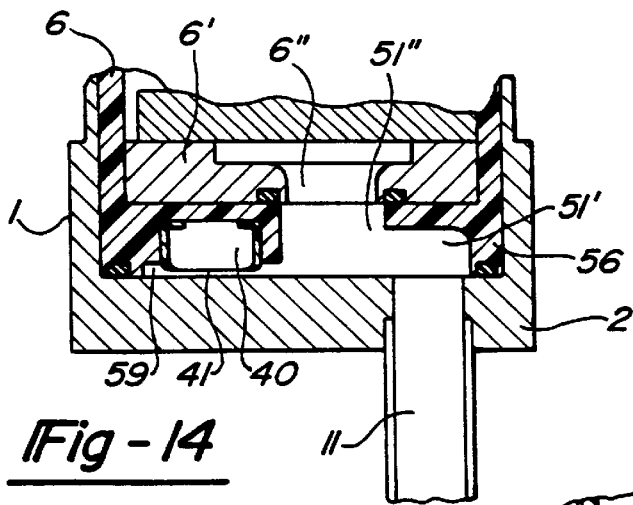
FIG. 14 illustrates the envelope of FIG. 12 installed in the bottom of a cartridge.

FIG. 14 illustrates that the arrangement of FIG. 12 may also be utilized within the bottom 56 of cartridge 6. This bottom 56 has, for each flow path (i.e., both for hot water and for cold water) a passage 51' which corresponds to a supply tube 11, and a passage 51" which corresponds to a passage 6" of the fixed plate 6' of cartridge 6. Passages 51' and 51" communicate with one another and with the space 59 where envelope 41, having the shape of a capsule, defining the air pocket 40 is located. The operation remains identical to that described above. Moreover, FIG. 14 provides an actual example of connecting supply tubes and cartridge inlets (in this case, the passages of the fixed plate) not aligned with one another.

Figure 15:
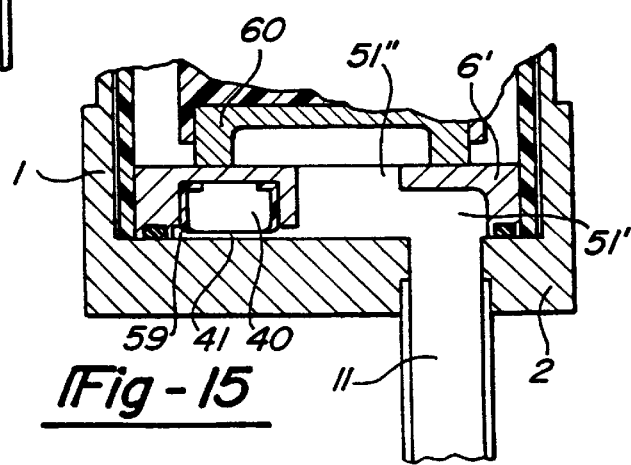
FIG. 15 illustrates the envelope of FIG. 12 installed in a fixed plate controlling the flow.

Finally, FIG. 15 illustrates that the arrangement of FIG. 12 may be utilized within the fixed plate 6' of the cartridge 6. In this case the parts illustrated in FIG. 14 which were utilized or installed within the bottom 56 of cartridge 6 are now utilized or installed within the fixed plate 6' of the cartridge. The passage 51" forms one of the passages provided in the fixed plate 6' which cooperate with the movable plate 6° of cartridge 6.

In the embodiments illustrated in FIGS. 8 to 15 the envelope which defines the air pocket is shown as inserted in a corresponding hollow seat. However it is to be understood that such an envelope could also be mounted in a different way onto a supporting member such as by gluing, welding or inserting the same as a cap on a supporting member or a coupling collar. Moreover, the envelope may also be provided in a closed shape in a manner similar to the cylindrical envelope illustrated in FIG. 2. In such case the envelope encloses an air pocket without cooperating with any external part.

The envelope which defines the air pocket should be of a flexible material. However, it is preferable that the material also is elastic, and more particularly, that it is an elastomeric material.

The examples which have been described and shown illustrate a number of embodiments of the present invention. Other embodiments may be selected provided that each envelope defining an air pocket is installed in a space which is not in the direct path of the flowing water but which communicates with spaces through which the water flow runs. Therefore, the space wherein an envelope defining an air pocket intended to effect the dampening action is installed may be located in any part of a tap or tap cartridge, or in a connection or tube section, or in any part of a hydraulic plant which is in communication with the spaces through which runs the water flow whose vibration and noise are to be dampened.

Variations and modifications of the present invention are possible without departing from the scope and spirit of the present invention as defined by the appended claims.

What is claimed is:

1. A device for dampening the vibration and noise produced in a mixing valve comprising a top body having a bottom wall and containing a cartridge including a bottom wall, said cartridge containing at least one fixed plate and at least one movable plate cooperating to control at least the volume of water, and at least one water supply pipe in communication with said mixing valve, said device comprising an envelope comprised of flexible material in the shape of a capsule disposed in a space formed in an intermediate member adapted to be inserted between said bottom wall of said top body and said bottom wall of said cartridge, said capsule being disposed out of the direct path of water flow through said valve and comprising at least one thin wall acting as a membrane and at least one peripheral wall.

2. A device of claim 1 wherein said flexible material forming said envelope is comprised of an elastomeric material.

3. A device of claim 1 wherein said capsule has at least one inner rim which extends inwardly from the end of said peripheral wall, said rim being opposite said thin wall.

4. A device of claim 1 wherein said capsule and the bottom of said intermediate member define a closed space.

5. A device of claim 4 wherein said closed space contains air.

* * * * *